United States Patent [19]

Ikeno et al.

[11] Patent Number: 5,130,399
[45] Date of Patent: Jul. 14, 1992

[54] PROCESS FOR PREPARATION OF ORGANOPOLYSILOXANES

[75] Inventors: Masayuki Ikeno; Hiroyasu Hara, both of Annaka, Japan

[73] Assignee: Shin-Etsu Chemical Co., Ltd., Tokyo, Japan

[21] Appl. No.: 702,299

[22] Filed: May 20, 1991

[30] Foreign Application Priority Data

May 22, 1990 [JP] Japan ................ 2-132247

[51] Int. Cl.$^5$ .............................................. C08G 77/04
[52] U.S. Cl. ......................................... 528/14; 528/33
[58] Field of Search ................................ 528/14, 33

[56] References Cited

U.S. PATENT DOCUMENTS

| | | | |
|---|---|---|---|
| 3,946,076 | 3/1976 | Paasen et al. | 568/360 |
| 4,308,366 | 12/1981 | Millet | 528/14 |
| 4,356,293 | 10/1982 | Deubzer et al. | 528/14 |
| 4,526,954 | 7/1985 | Williams | 528/14 |
| 4,625,011 | 11/1986 | Kosal et al. | 528/14 |
| 4,831,265 | 5/1989 | Watanabe et al. | 549/416 |

OTHER PUBLICATIONS

Noll, Walter, "Chemistry and Technology of Silicons" 1968, pp. 211–217, and 226–227.

Primary Examiner—John C. Bleutge
Assistant Examiner—Margaret W. Glass
Attorney, Agent, or Firm—Nixon & Vanderhye; Nixon & Vanderhye

[57] ABSTRACT

The present process for producing an organopolysiloxane is characterized in that the polymerization of an organosiloxane by using an alkali catalyst is carried out in the presence of a reversible dehydrating agent such as magnesium sulfate and calcium carbonate or an irreversible dehydrating agent such as calcium oxide. According to this manufacturing process, there is a quite distinct mutual relation between the preset composition of the organopolysiloxane to be manufactured and the viscosity of the actually manufactured organopolysiloxane.

12 Claims, No Drawings

PROCESS FOR PREPARATION OF ORGANOPOLYSILOXANES

BACKGROUND OF THE INVENTION

1. Field of the Invention

The present invention relates to a process for the preparation of organopolysiloxanes by polymerizing organosiloxanes.

2. Description of the Prior Art

The process for producing organopolysiloxanes by the polymerization of organosiloxanes using an alkali catalyst is conventionally known in the art (W. NOLL, CHEMISTRY AND TECHNOLOGY OF SILICONES, Academic Press (1968)).

However, in such a conventionally known manufacturing process, there is no mutual relation between the preset or intended composition of an organopolysiloxane to be manufactured and the viscosity of an actually manufactured organopolysiloxane, and the value of the viscosity scatters considerably in regard to the preset composition. Consequently, in view, for example, of the control of the quality, a manufacturing process is demanded wherein the viscosity of the obtained organopolysiloxane shows a favorable mutual relation with the preset composition.

SUMMARY OF THE INVENTION

Therefore, the object of the present invention is to provide a process for producing an organopolysiloxane by a quite simple means which can satisfy such a demand.

According to the present invention, there is provided a process for producing an organopolysiloxane comprising polymerizing an organosiloxane using an alkali catalyst in the presence of a dehydrating agent.

That is, the present invention has successfully attained the above object by a quite simple means wherein the polymerization is carried out using a dehydrating agent.

DETAILED DESCRIPTION OF THE INVENTION

Generally, organosiloxanes used as raw materials contain a trace amount of water and sometimes such organosiloxanes have silanol groups at the ends of the molecules. When these organosiloxanes are polymerized, silanol groups are formed also at the ends of the molecules of parts of the obtained organopolysiloxanes and as a result it is considered that the scatter of the viscosity becomes great for the preset composition. In this case, it is considered to carry out the polymerization after dehydrating the organosiloxane which is the raw material by heating, but it is difficult to carry out the dehydration completely and that causes part of the raw material to volatilize to change the preset composition, so that the scatter of the viscosity cannot be obviated either.

Thus, according to the present invention, since a dehydrating agent is used, water present in the raw material organosiloxane and water produced by the condensation of the silanol groups are absorbed into the dehydrating agent. Therefore water does not take part in the polymerization reaction, so that it has become possible to suppress effectively the scatter of the viscosity of the obtained organopolysiloxane for the preset composition.

RAW MATERIALS

In the present manufacturing process, examples of the organosiloxane used as a starting raw material include cyclic organosiloxanes and low-molecular weight straight-chain or branched organosiloxanes produced by hydrolyzing organohalosilanes represented by the following general formula [I]:

wherein R represents a substituted or unsubstituted monovalent hydrocarbon group, X represents a halogen atom, and n is an integer of 0 to 3.

Organosiloxanes used particularly preferably in the present invention are cyclic diorganosiloxane oligomers represented by the following formula [II]:

wherein R has the same meaning as defined above and p is an integer of 3 to 10, acyclic diorganosiloxane oligomers represented by the following formula [III]:

wherein R has the same meaning as defined above and q is an integer of 2 to 10, and acyclic diorganosiloxane oligomers represented by the following formula [IV]:

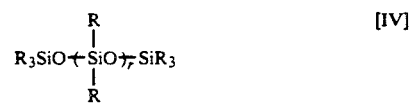

wherein R has the same meaning as defined above and r is an integer of 0 to 10.

These diorganosiloxane oligomers may be used singly or as a mixture of two or more.

In the above formulae [I] to [IV], the unsubstituted monovalent hydrocarbon group represented by R includes those having generally 1 to 10, preferably 1 to 6, carbon atoms, for example, an alkyl group such as a methyl group, an ethyl group, a propyl group, a butyl group, a hexyl group, and an octyl group, an alkenyl group such as a vinyl group, an allyl group, and a hexenyl group, a cycloalkyl group such as a cyclohexyl group, a cycloalkenyl group such as a cyclohexenyl group, an aryl group such as a phenyl group and a tolyl group, and an aralkyl group such as a benzyl group and a 2-phenylethyl group. The substituted monovalent hydrocarbon group includes halogenated hydrocarbon groups such as a chloromethyl group, a 3-chloropropyl group, a 3,3,3-trifluoropropyl group, an $\alpha,\alpha,\alpha$-trifluorotolyl group, a chlorobenzyl group, and a bromopropyl group and cyanohydrocarbon groups such as a cyanoethyl group and a cyanopropyl group. A methyl group, a vinyl group, a phenyl group, and a 3,3,3-trifluoropropyl group are generally preferable.

POLYMERIZATION REACTION

In the present manufacturing process, the polymerization of the above-mentioned organosiloxanes is carried out by an equilibration reaction under conditions known per se in the presence of an alkali catalyst except for the use of a dehydrating agent. For example, the polymerization can be carried out at a temperature of from room temperature to 180° C. without any solvent or can be carried out by an equilibration reaction using a suitable solvent.

As the alkali catalyst, for example, an alkali metal compound such as NaOH, KOH, sodium silanolates, and potassium silanolates; an alkylphosphonium hydroxide such as tetrabutylphosphonium hydroxide ($Bu_4$POH); an alkylammonium hydroxide such as tetramethylammonium hydroxide ($Me_4NOH$); and 1,8-diazabicyclo(5.4.0)undecene-7 (DBU) are preferably used. Generally, when an alkylphosphonium hydroxide or an alkylammonium hydroxide is used, the equilibration reaction is carried out at a relatively low temperature, for example, at a temperature in the range of 100° to 130° C., preferably 110° to 120° C. and the catalyst is used generally in an amount of 0.001 to 0.1% by weight, preferably 0.001 to 0.04% by weight, based on the organosiloxane. If an alkali metal compound is used, the equilibration reaction is carried out at a relatively high temperature, for example, at a temperature in the range of 130° to 160° C. and the alkali catalyst is used in an amount such that the molar ratio of the silicon atoms (Si) in the organosiloxane to the alkali metal atom (M), i.e., Si/M, is in the range of 2,000 to 5,000.

Although, as the dehydrating agent, various dehydrating agents, for example, those which can take up water as water of crystallization reversely or those which can take up water irreversibly by a chemical reaction can be employed, generally a neutral or basic dehydrating agent is preferably used. Specifically, examples of the reversible dehydrating agent include sulfates such as magnesium sulfate, potassium sulfate, and sodium sulfate, carbonates such as calcium carbonate, and alumina and examples of the irreversible dehydrating agent include metal oxides such as calcium oxide and barium oxide. Generally, when the equilibration reaction is carried out at a relatively low temperature using an alkylphosphonium hydroxide or an alkylammonium hydroxide as the alkali catalyst, either of a reversible dehydrating agent and an irreversible dehydrating agent is preferably used, but when the equilibration reaction is carried out at a relatively high temperature, it is preferable to use an irreversible dehydrating agent that neither liberates water nor looses the dehydrating effect even at the high temperature.

The above-mentioned dehydrating agents may be used singly or as a mixture of two or more and generally it is desirable to use the dehydrating agent in such an amount that the dehydrating agent will theoretically absorb from one to ten times, preferably from two to five times water present in the reaction system. Generally, the dehydrating agent is used in an amount in the range of 0.15 to 1.5% by weight, preferably 0.5 to 1.% by weight, based on the raw material organosiloxane.

After the completion of the reaction, the catalyst is neutralized, filtration is effected to remove the catalyst and the dehydrating agent, and then the filtrate is subjected to purification such as distillation to give the intended organopolysiloxane.

THE ORGANOPOLYSILOXANE

The thus produced organopolysiloxane is a homopolymer or a copolymer made up of $R_3SiO_{0.5}$ units, $R_2SiO$ units, $RSiO_{1.5}$ units, $SiO_2$ units, etc. wherein R has the same meaning as defined above. The organopolysiloxane does not have silanol groups at the ends of the molecule and has a viscosity that corresponds to the preset composition and scatters quite less.

EXAMPLES

Example 1

As raw materials, three organosiloxanes (A) to (C) given below were used and they were blended as shown in Table 1 to synthesize five organopolysiloxanes different in composition.

(A) $(CH_3)_3SiO[(CH_3)_2SiO]_3Si(CH_3)_3$, (B) $[(CH_3)_2SiO]_n$ wherein n=4, and (C) a copolymer consisting of 86 mol % of $(CH_3)_2SiO$ and 14 mol % of $CH_3SiO_{1.5}$.

In each of the syntheses, the reaction was carried out as follows: 1.3 g of calcium oxide and 0.88 g of 10% potassium dimethylsilanolate were added to 300 g of the mixed organosiloxanes of each composition and the polymerization reaction was carried out for 9 hours at 150° C.

Thereafter the temperature was lowered to 30° C., then 8 g of trimethylchlorosilane and 16 g of hexamethyl silazane were added to the mixture, which were then stirred for 2 hours. The reaction mixture was neutralized and then heated at 180° C. for 4 hours under a pressure of 30 mmHg to distill off low-boiling matter, thereby producing an organopolysiloxane.

For comparison, the above procedure was repeated for each of the above preset compositions, except that the calcium oxide as a dehydrating agent was not used, thereby preparing organopolysiloxanes.

The viscosities of the obtained organopolysiloxanes at 25° C. and the preset compositions are shown in Table 1.

In Table 1, M stands for $CH_3SiO_{0.5}$ unit, D stands for $(CH_3)_2SiO$ unit, and T stands for $CH_3SiO_{1.5}$ unit.

TABLE 1

| Raw material (g) | | | Preset composition | M (mol %) | Viscosity (cP, 25° C.) | |
| --- | --- | --- | --- | --- | --- | --- |
| | | | | | A dehydrating agent was used. | Any dehydrating agent was not used. |
| A | B | C | | | | |
| 19.9 | 63.6 | 216.6 | $M_{0.85}TD_{31.45}$ | 2.55 | Solidified | 300 |
| 21.0 | 63.6 | 215.4 | $M_{0.90}TD_{31.40}$ | 2.70 | 4500 | 800 |
| 22.0 | 63.6 | 214.2 | $M_{0.95}TD_{31.35}$ | 2.85 | 1400 | 400 |
| 23.4 | 63.6 | 213.2 | $M_{1.00}TD_{31.30}$ | 3.00 | 900 | 600 |
| 24.5 | 63.6 | 211.9 | $M_{1.05}TD_{31.25}$ | 3.15 | 700 | 500 |

EXAMPLE 2

As raw materials, three organosiloxanes (D) to (F) given below were used and they were blended as shown in Table 2 to synthesize four organopolysiloxanes different in composition.

(D) $CH_3(CH_2=CH)C_6H_5SiOSiCH_3(CH_2=CH)C_6H_5$, (E) $[(CH_3)_2SiO]_n$ wherein n=4, and (F) a copolymer consisting of 86 mol % of $(CH_3)_2SiO$ and 14 mol % of $CH_3SiO_{1.5}$.

In each synthesis, the reaction was carried out in the same manner as in Example 1, except that the above organopolysiloxanes were used.

For comparison, similarly to Example 1, the above procedure was repeated for each of the above preset compositions, except that the calcium oxide as a dehydrating agent was not used, thereby preparing organopolysiloxanes.

The viscosities of the obtained organopolysiloxanes at 25° C. and the preset compositions are shown in Table 2.

In Table 2, M' stands for $CH_3(CH_2=CH)SiO_{0.5}$ unit and D and T have the same meanings as in Table 1.

TABLE 2

| Raw material (g) | | | Preset composition | M (mol %) | Viscosity (cP, 25° C.) | |
|---|---|---|---|---|---|---|
| A | B | C | | | A dehydrating agent was used. | Any dehydrating agent was not used. |
| 16.5 | 61.9 | 221.6 | $M'_{0.90}TD_{31.40}$ | 2.70 | Solidified | 400 |
| 17.4 | 61.8 | 220.8 | $M'_{0.95}TD_{31.35}$ | 2.85 | 2500 | 300 |
| 18.3 | 61.7 | 220.0 | $M'_{1.00}TD_{31.30}$ | 3.00 | 1100 | 800 |
| 19.2 | 61.6 | 219.2 | $M'_{1.05}TD_{31.25}$ | 3.15 | 800 | 300 |

As apparent from the experimental results shown in Tables 1 and 2, according to the present process wherein a dehydrating agent is used, the viscosity of the obtained organopolysiloxanes relates correspondingly to the preset composition; for example, the viscosity decreases as the content of the constituent unit M or M' increases. In contrast, if a dehydrating agent is not used, the viscosity of the obtained organopolysiloxane has no relation to the preset composition and shows quite scattered values only.

We claim:

1. A process for producing an organopolysiloxane, comprising polymerizing an organosiloxane using an alkali catalyst in the presence of a dehydrating agent.

2. A process as claimed in claim 1, wherein said dehydrating agent is at least one reversible dehydrating agent selected from the group consisting of magnesium sulfate, calcium sulfate, sodium sulfate, calcium carbonate, and alumina.

3. A process as claimed in claim 2, wherein said dehydrating agent is present in an amount of 0.15 to 1.5% by weight based on the organosiloxane.

4. A process as claimed in claim 1, wherein said dehydrating agent is at least one irreversible dehydrating agent selected from the group consisting of calcium oxide and barium oxide.

5. A process as claimed in claim 3, wherein said dehydrating agent is present in an amount of 0.15 to 1.5% by weight based on the organosiloxane.

6. A process as claimed in claim 1, wherein said alkali catalyst is at least one selected from the group consisting of alkali metal compounds, alkylphosphonium hydroxides, alkylammonium hydroxides, and 1,8-diazabicyclo(5.4.0)undecene-7.

7. A process as claimed in claim 6, wherein said alkali catalyst is an alkylphosphonium hydroxide or an alkylammonium hydroxide and the polymerization is carried out at a temperature of 100° to 130° C.

8. A process as claimed in claim 7, wherein said alkali catalyst is used in an amount of 0.001 to 0.1% by weight based on the raw material organosiloxane.

9. A process as claimed in claim 6, wherein said alkali catalyst is at least one alkali metal compound selected from the group consisting of NaOH, KOH, sodium silanolates, and potassium silanolates and the polymerization is carried out at a temperature of 130° to 160° C.

10. A process as claimed in claim 9, wherein the dehydrating agent is an irreversible dehydrating agent.

11. A process as claimed in claim 9, wherein said alkali catalyst is used in an amount such that the molar ratio of the silicon atoms in the organosiloxane to the alkali metal atom ranges from 2,000 to 5,000.

12. A process as claimed in claim 1, wherein said organosiloxane is at least one member selected from the group consisting of cyclic diorganosiloxane oligomers represented by the following formula:

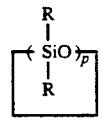

wherein R represents a substituted or unsubstituted monovalent hydrocarbon group having 1 to 10 carbon atoms and p is an integer of 3 to 10, linear diorganosiloxane oligomers represented by the following formula:

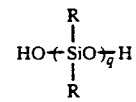

wherein R has the same meaning as defined above and q is an integer of 2 to 10, and linear diorganosiloxane oligomers represented by the following formula:

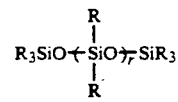

wherein R has the same meaning as defined above and r is an integer of 0 to 10.

* * * * *